UNITED STATES PATENT OFFICE.

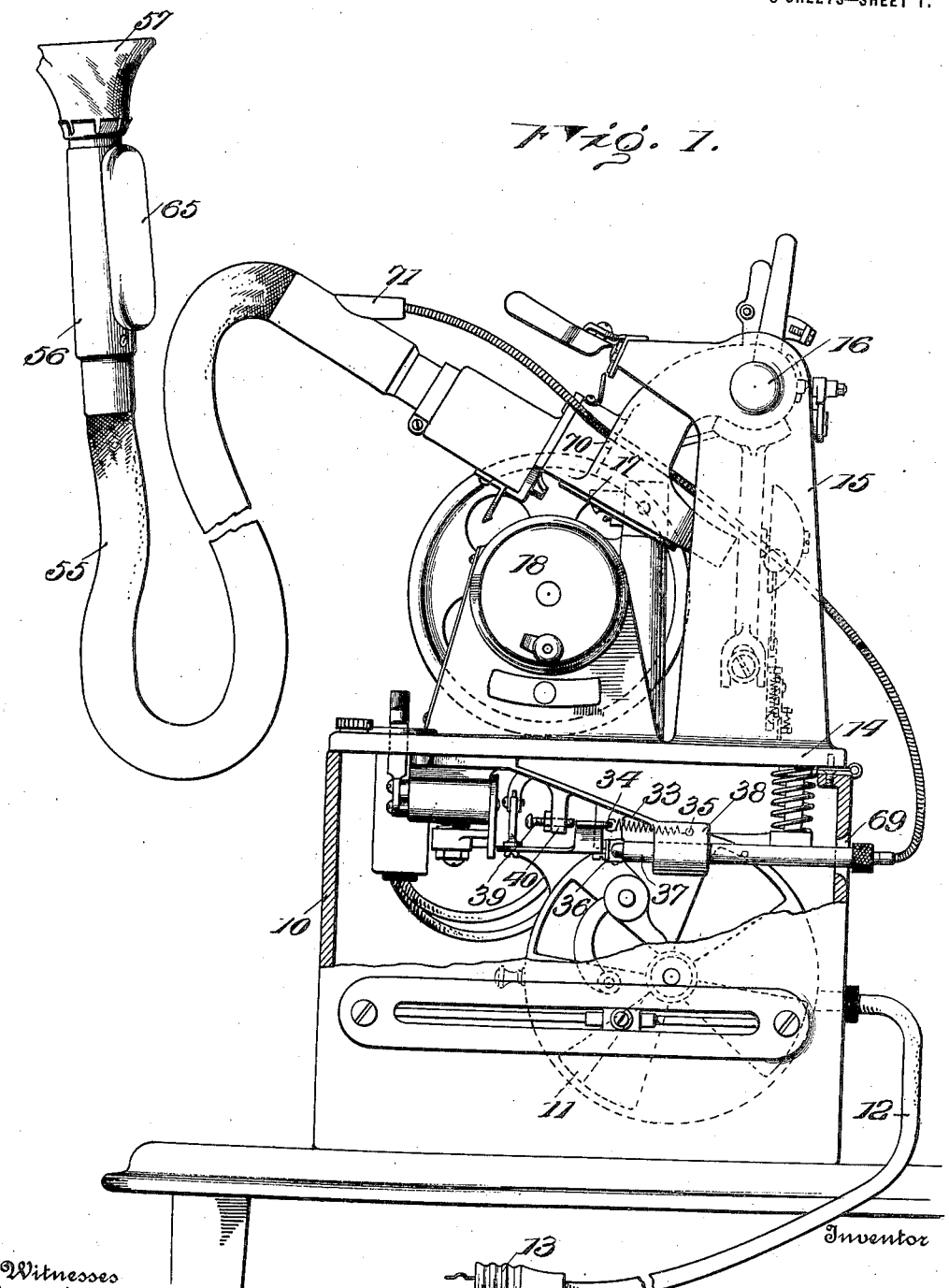

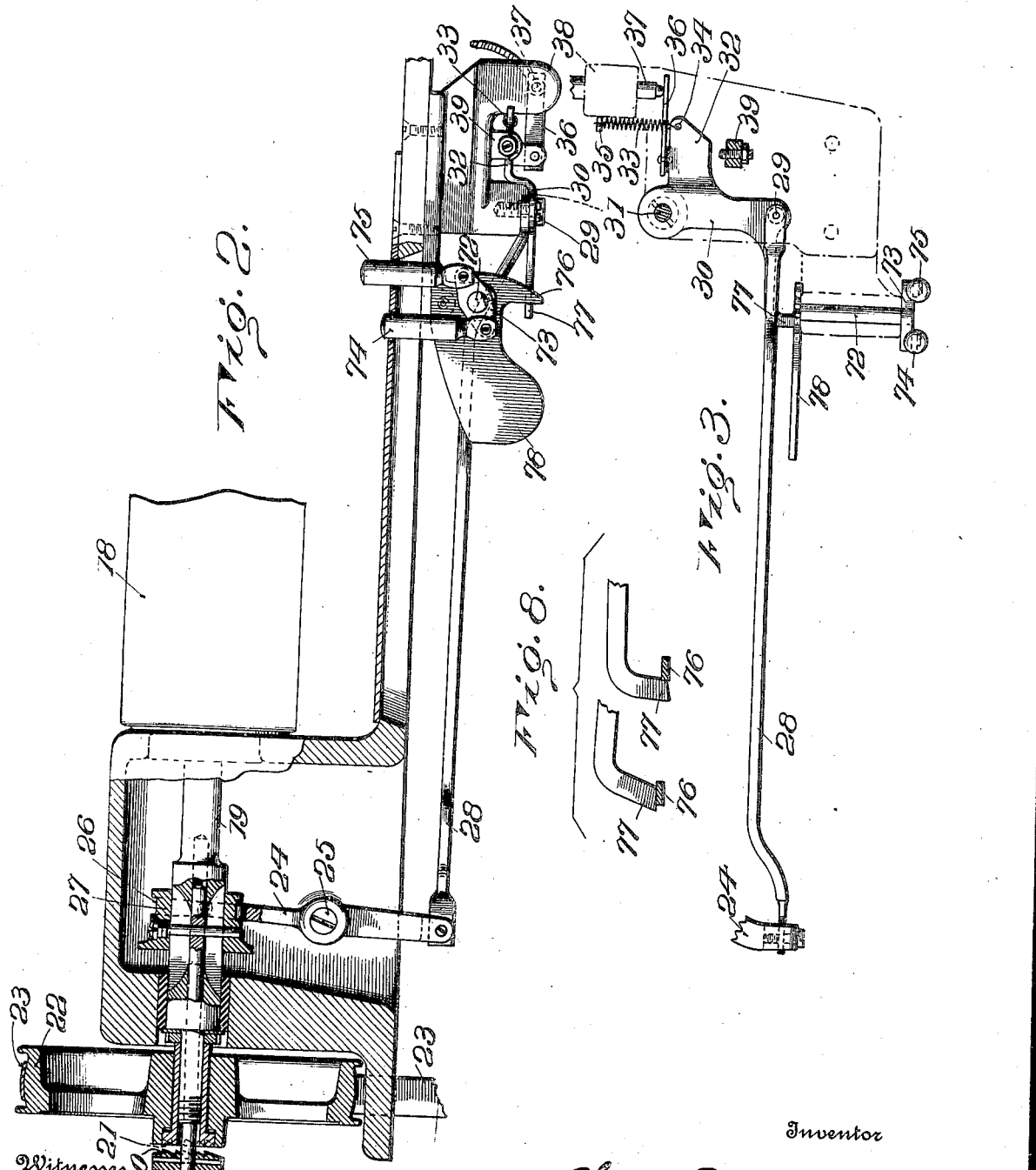

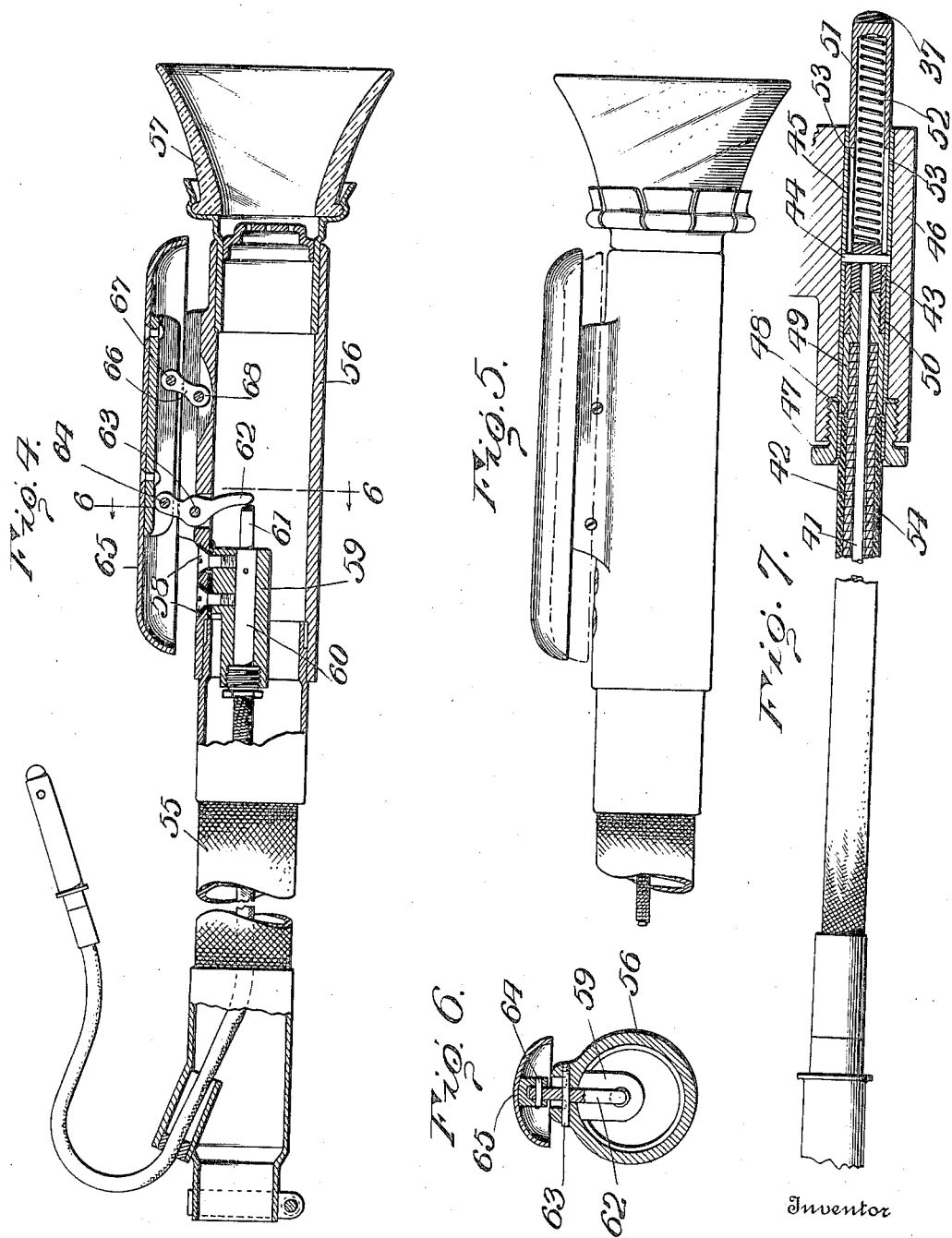

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

START AND STOP DEVICE FOR TALKING-MACHINES.

1,203,088.  Specification of Letters Patent.  Patented Oct. 31, 1916.

Application filed September 8, 1913. Serial No. 788,695.

*To all whom it may concern:*

Be it known that I, CLINTON E. WOODS, of Bridgeport, Connecticut, have invented a new and useful Improvement in Start and Stop Devices for Talking-Machines, which invention is fully set forth in the following specification.

This invention relates to talking machines, and more particularly to the start-and-stop mechanism thereof, and has for its object to provide a simple, convenient and efficient means for starting and stopping the operation of the parts, whether it be the starting and stopping of a motor, or the starting and stopping of parts operated by a continuously moving motor.

Generally stated, the invention consists in any suitable start-and-stop mechanism, such as a switch that may be closed or opened for the purpose of admitting electric current to or excluding it from the motor, or a clutch mechanism which may be closed or opened for the purpose of connecting the moving parts of the machine to, or disconnecting them from, a continuously driven motor. Said start-and-stop mechanism in the present invention is combined in operative relation with one terminal of a flexible power transmitting means, a Bowden wire being the means most suitable. The other terminal of the power transmitting means is freely movable bodily in any direction relatively to the start-and-stop mechanism, and is adapted to be manually manipulated to control the said mechanism. By the term "manually," as hereinafter used, is meant, not only a hand-operated, but a foot-operated, mechanism, or any other means that is actuated by the operator to impart the desired movement to the power transmitting means.

The inventive idea involved is capable of receiving a variety of mechanical expressions, one of which, for the purpose of illustrating the invention, is shown in the accompanying drawings, but it is to be expressly understood that such drawings are illustrative only, and are not designed to define the limits of the invention, reference being had to the appended claims for this purpose.

In said drawings Figure 1 is a cross-sectional view, with parts in elevation, of a talking machine of the "Dictaphone" type, embodying the invention; Fig. 2 is a longitudinal vertical section, partly in elevation, illustrating the operation of the device; Fig. 3 is a plan view corresponding to Fig. 2, some of the parts being omitted; Fig. 4 is a longitudinal section, partly in elevation, of the speaking tube, showing one means for operating the Bowden wire from the speaking tube; Fig. 5 is an elevation of the mouth-end of the speaking tube; Fig. 6 is a cross-section on the line 6—6 of Fig. 4; Fig. 7 is a longitudinal section, partly in elevation, showing the Bowden wire and the mounting for one of the terminals thereof; and Fig. 8 is a detail.

Referring to the drawings, wherein like reference numerals indicate like parts, 10 is the casing of the machine, in which is mounted, in any usual or suitable manner, an electric motor 11, to which current is delivered through the conductor 12, provided with a plug 13. The top plate of the casing is indicated at 14, and is provided with a pair of standards, one of which, 15, is shown in Fig. 1, said standards supporting the sleeve 16, in which is inclosed the usual feed-screw that propels the sound-box 17 longitudinally of the mandrel 18, on which the tablet is carried, said mandrel being supported on a shaft 19, on the end of which is one member 20 of any usual or suitable clutch mechanism, the other member 21 of which is secured to a continuously driven pulley 22, driven by a belt 23 from the motor 11. The clutch 20—21 is thrown into and out of operation by means of a lever 24 pivoted at 25, and having its forked end 26 engaging a clutch-shifting sleeve 27, and operating in a way that is well understood in the art. The clutch mechanism and clutch-shifting device shown are a preferred form, but any suitable clutch and shifting mechanism therefor may be employed. Connected to the lower arm of the lever 24 is a rod 28, which extends under the top plate or bed plate 14 of the machine, and is connected at its other end 29 to one arm 30 of a bell-crank lever fulcrumed at 31. The other arm 32 of said bell-crank lever has a spring 33 connected thereto at 34, the other end of the spring being connected at 35 to any permanent part of the machine. Secured to the arm 32 of the bell-crank lever is a spring blade 36, with which contacts one terminal 37 of a flexible power transmitting means which is illustrated as being a Bowden wire. The terminal 37 is mounted in a casting 38 secured to the under-side of the bed plate 14. Rocking movement of the bell-crank lever 30—32 is limited by a stop screw 39, passing through a part 40 of the casting.

It is essential that the flexible power transmitting means shall consist of two permanent trains of mechanical elements one movable relatively to the other, and both freely movable bodily in any direction relatively to the fixed terminal 37. As will hereinafter more clearly appear, the free or impulse-receiving end of the power transmitting means is without any fixed or permanent support which can be relied upon to furnish an abutment to take the reaction resulting from the transmission of power. It is therefore necessary for the power transmitting means to have, as an essential part thereof, a permanent connection between the impulse-receiving and the impulse-imparting ends which is capable of taking the reactions. By providing a power transmitting means comprising two permanent relatively movable trains of mechanical elements, I am enabled to use one of the said trains for transmitting the power or the motion and the other for taking the reaction thereof. As stated, the power transmitting means is preferably a Bowden wire, which as is well known, consists of a core wire, having a closely wound coil or wire sheathing surrounding the same, the two parts being capable of longitudinal movement relative to each other. In the present invention, advantage is taken of this relative movement of the two parts of the Bowden wire to actuate the start-and-stop mechanism, by anchoring one member of the Bowden wire structure at the respective terminals thereof, and providing means for imparting movement to the other member at one terminal, which movement is transmitted to the other terminal placed in operative relation with the start and stop mechanism. Either member of the Bowden wire may be anchored, the other being left free to have movement imparted thereto. In the present instance, for the purpose of illustrating the invention, the inner member is anchored at its respective terminals, while the outer member is left free to move thereon.

The anchoring mechanism of the Bowden wire is substantially the same at each of the terminals, one of which is illustrated in detail in Fig. 7, in which 41 is the inner member or core of the Bowden wire, and 42 is the outer member or coiled sheath thereof. The inner member is secured in any suitable manner, as by soldering, to a block 43, which block is permanently fixed, by a pin 44 extending therethrough, to a tube 45, secured in an opening in the casting 46 by means of a tubular screw or nut 47, engaging the flanged end 48 of the tube. The outer member 42 of the Bowden wire is secured, in any manner, as by soldering, within a cup-shaped plug 49, having a screw-threaded plug-end 50, which is screwed into the open end of a tubular terminal piece 51, a spring 52 being inclosed by the tubular terminal 51 between its closed end and the block 43. Said tubular terminal is provided with two slots 53 on opposite sides thereof, which play over the pin 44. As illustrated in Fig. 7, the terminal is shown projected to the right to the farthest limit of its outward movement. The Bowden wire may be, and usually is, provided with some suitable protective covering 54, of rubber or any other desirable material.

One of the terminals, as for example, the terminal 37 (Fig. 1) is mounted in operative relation with the start and stop mechanism of the talking machine. For example, as shown in Figs. 2 and 3, if the terminal 37 is projected outward, it will force the spring plate 36 (Fig. 3) downward, thereby rocking the bell-crank lever 30—32 on its fulcrum 31, shifting the rod 28 from right to left, and throwing the clutch members 20 and 21 into engagement, thereby starting the mandrel 18, and when pressure on the terminal 37 is removed, the spring 33 operates to shift the rod 28, through the bell-crank lever 30—32, from left to right, thereby opening the clutch members 20 and 21, and stopping the mandrel.

In Figs. 4, 5 and 6, is illustrated one manually operated means for actuating the other terminal of the Bowden wire, but it will be understood that the invention, as concerns some of its features, is not limited to the specific manually operated means here illustrated. In the construction shown 55 is the usual or any suitable speaking tube, connected to the talking machine as shown in Fig. 1, and 56 is a metallic tubular member secured to the end of the tube 55, and having the usual or any suitable mouthpiece 57 thereon. Mounted within the metallic tube 56, by means of two screws 58, 58, is a casting 59, having a tubular opening therethrough, and corresponding to the casting 46, shown in Fig. 7, for receiving the other terminal 60 of the Bowden wire, the projecting end 61 of the terminal being in operative relation with a lever 62 fulcrumed at 63 to the metallic tube 56. Said lever 62 is provided with an upwardly projecting arm pivoted at 64 to a hand-grip or a button 65. Said hand-grip is also connected to the tubular member 56 by a link 66, pivoted at one end 67 to the hand-grip, and the other end 68 to the tubular member, the parts being so constructed and proportioned that when the speaking tube and the hand-grip are grasped by the hand of the operator, the said hand-grip is moved downwardly against the tubular member 56, thereby shifting the levers 62 from right to left in Fig. 4, and giving an initial thrust to the terminal 61. It being remembered that said terminal is connected to the outer or sheath member 42 of the Bowden wire, this thrust is transmitted, through the outer member of the Bowden wire, to the terminal 37 in operative relation with the start-and-stop mechanism, thereby transmitting movement through the bell-crank lever 30—32 to the rod 28 (from right to left), closing the clutch 20—21 and starting the mandrel. When the grip of the operator is released, the spring 52 in the terminal 61, and the spring 33 connected to the bell-crank lever 30—32, act to shift the rod 28 from left to right, opening the clutch and stopping the mandrel. Preferably, the Bowden wire enters the casing 10 of the machine at the rear thereof, through an opening 69 (Fig. 1), and then passes upward, where, if desired, it may be supported on the recorder-reproducer, as at 70, and then preferably enters the speaking tube at a point 71, and extends within the speaking tube to the terminal support 59, hereinbefore described.

Means are provided whereby the start-and-stop mechanism may be operated by hand, independent of the Bowden wire construction, if desired, such means being illustrated in Figs. 1, 2 and 3, in which 72 is a rock shaft, mounted in any permanent part of the machine, and having rigidly fixed thereto a rocking beam 73, to the opposite ends of which are pivoted a stop-push-plug 74 and a start-push-plug 75, projecting upward through suitable openings in the bed plate of the machine, as shown in Fig. 2. Keyed to the rock shaft 72 is a downwardly depending lever arm 76, and the arm 30 of the bell-crank lever 30—32 has a forwardly projecting hooked member 77 (Figs. 2 and 3), which hooked end is slightly beveled at its extremity and is provided with a shoulder lying in the path of the downwardly depending lever arm 76 when the rock shaft is rocked by pushing the starting plug 75, thereby rocking the lever arm 76 from right to left. The engagement of the lever arm 76 with the shoulder on the hooked member 77 is, however, very slight, as will be seen by reference to the detail view shown in Fig. 8. As the start-plug 75 is pushed downward, lever arm 76 first engages the shoulder on the hooked arm 77, and as the bell-crank-lever 30—32 rocks on its fulcrum 31, said shoulder is turned slightly out of the path of movement of the lever arm 76, the side of which lever arm then contacts with very decided friction against the beveled end of the hooked arm 77, thereby serving to hold the parts in the position with the starting plug 75 depressed, the metal of the parts yielding slightly to permit this action. On the rock shaft 72, and as here shown, integral with the lever arm 76, is a counterweight 78, and when the stop-plug 74 is depressed, the weight operates to insure the full rocking action of the rock shaft 72, to the position of the parts as shown in Fig. 2. To start and stop the machine by the use of the means last described, the starting plug 75 is depressed, thereby closing the clutch 20—21, and the machine is started. This action elevates the stop-plug 74, and when it is desired to stop the machine, such plug is depressed, thereby opening the clutch 20—21, and stopping the machine.

While, for the purpose of describing the invention, the specific start-and-stop mechanism and other specific means of anchoring the Bowden wire and the specific features, such as the means for imparting relative movement to the members of the Bowden wire have been described with considerable particularity, it is not to be understood that the invention is limited to the specific means thus shown and described, since it will be apparent to those skilled in the art that such means may, if desired, be varied within wide limits, without departing from the inventive idea involved, the limits of the invention being defined in the appended claims.

What is claimed is:—

1. The combination with a talking machine comprising a start-and-stop mechanism, of a manually operable control device bodily movable at will in any direction relatively to the start-and-stop mechanism, and a flexible mechanical connecting means interposed between the control device and the start-and-stop mechanism comprising two permanent trains of mechanical elements one movable relatively to the other, the said means serving to maintain a permanent positive operating connection between the said device and the said mechanism while permitting the former to be freely moved as aforesaid.

2. The combination with a talking machine comprising a start-and-stop mechanism, of a manually operable control means for the start-and-stop mechanism comprising a Bowden wire having one end connected with the said mechanism and having the other end bodily movable at will in any direction relatively to the start-and-stop mechanism.

3. The combination with a talking machine comprising a start-and-stop mechanism, of a manually operable control device for the start-and-stop mechanism bodily movable at will in any direction with respect to the start-and-stop mechanism and comprising a button movable relatively to the other parts thereof, and a Bowden wire having one end connected with the start-and-stop mechanism and the other end connected with the control device with its axis at an angle to the line of movement of the button, the Bowden wire serving to maintain a permanent positive operating connection between the said mechanism and the said device while permitting the latter to be freely moved as aforesaid.

4. The combination with a talking machine comprising a start-and-stop mechanism, of a manually operable control means for the start-and-stop mechanism comprising a Bowden wire having one end connected with the said mechanism and having the other end bodily movable at will in any direction relatively to the start-and-stop mechanism, and means at the first said end of the wire for holding the inner element thereof against longitudinal movement, the said means permitting the outer element to be relatively moved longitudinally.

5. In a talking machine, the combination with start-and-stop mechanism, a lever mechanism freely movable bodily in any direction relatively to the start-and-stop mechanism, and a Bowden wire having one terminal in operative relation with said lever mechanism and bodily movable therewith, the other terminal of the Bowden wire being in operative relation with the start-and-stop mechanism of the talking machine.

6. The combination with a talking machine comprising a start-and-stop mechanism, of a flexible speaking tube having its outer end bodily movable at will in any direction relatively to the start-and-stop mechanism, a manually operable control device mounted on the outer end of the speaking tube and bodily movable therewith, and a flexible mechanical connecting means interposed between the control device and the start-and-stop mechanism comprising two permanent trains of mechanical elements one movable relatively to the other, the said means serving to maintain a permanent positive operating connection between the said device and the said mechanism while permitting the former to be freely moved as aforesaid.

7. In a talking machine, the combination with start-and-stop mechanism, a flexible speaking tube having its outer end bodily movable at will in any direction relatively to the start-and-stop mechanism, a lever mechanism mounted on the outer end of the speaking tube and bodily movable therewith, and a Bowden wire having one terminal in operative relation with said lever mechanism and freely movable bodily therewith, the other terminal of the Bowden wire being in operative relation with the start-and-stop mechanism of the talking machine, said Bowden wire extending within the speaking tube.

8. In a talking machine, the combination with start-and-stop mechanism, a lever mechanism, manually actuated means for operating said lever mechanism, the said lever mechanism and the said manually actuated operating means therefor being freely movable bodily in any direction relatively to the start-and-stop mechanism, and a Bowden wire having one terminal in operative relation with said lever mechanism and freely movable bodily therewith, the other terminal of the Bowden wire being in operative relation with the start-and-stop mechanism of the talking machine.

9. The combination with a talking machine comprising a start-and-stop mechanism, of a flexible speaking tube having its outer end bodily movable at will in any direction relatively to the start-and-stop mechanism, a manually operable control button mounted on the end of the speaking tube and movable bodily therewith and relatively thereto toward or from its axis, and a Bowden wire having one end connected with the start-and-stop mechanism and having the other end extending along the flexible tube and connected with the control button, the Bowden wire serving to maintain a permanent positive operating connection between the said mechanism and the said button while permitting the latter to be freely moved as aforesaid.

10. In a talking machine, the combination with start-and-stop mechanism, a flexible speaking tube having its outer end bodily movable at will in any direction relatively to the start-and-stop mechanism, a lever mechanism mounted on the outer end of the speaking tube and bodily movable therewith, means actuated by the hand of the operator for operating said lever mechanism, the said means being also mounted on the outer end of the speaking tube and bodily movable therewith, and a Bowden wire having one terminal in operative relation with said lever mechanism and bodily movable therewith, the other terminal of the Bowden wire being in operative relation with the start-and-stop mechanism of the talking machine, said Bowden wire extending within the speaking tube.

11. In a talking machine, a mandrel shaft, a clutch associated therewith, a pivoted lever, connections between said clutch and pivoted lever, a lever mechanism freely movable bodily in any direction relatively to the said pivoted lever, and a Bowden wire having one of its terminals in operative relation with said pivoted lever and its other terminal in operative relation with said lever mechanism and movable bodily therewith.

12. The combination with a talking machine comprising a start-and-stop mechanism, of two manually operable control devices one bodily movable at will in any direction relatively to the start-and-stop mechanism and the other fixed against bodily movement relatively thereto, and a mechanical power transmitting system interposed between the said control devices and the start-and-stop mechanism and serving to maintain a permanent positive operating connection between the said devices and the said mechanism, one part of the said system being freely movable to permit the first said control device to be freely moved as aforesaid.

In testimony whereof I have signed this specification in the presence of two subscribing witnesses.

CLINTON E. WOODS.

Witnesses:
JOHN R. PETRIE,
JOHN S. GRIFFITH.